United States Patent Office 2,965,594
Patented Dec. 20, 1960

2,965,594

CARBOXYLIC ACID ESTER CONTAINING A QUATERNARY NITROGEN ATOM IN THE ALCOHOL PORTION, AND POLYMERIZATION PRODUCTS THEREOF

Arthur Maeder, Basel, Switzerland, assignor to Ciba Limited, Basel, Switzerland

No Drawing. Filed Oct. 25, 1954, Ser. No. 464,608

Claims priority, application Switzerland Oct. 30, 1953

9 Claims. (Cl. 260—29.6)

This invention is based on the observation that valuable water-dispersible copolymers can be obtained by jointly co-polymerizing an ester of an at least copolymerizable aliphatic carboxylic acid, which in the alcohol portion of the molecule contains at least one quaternary nitrogen atom which is not bound to the oxygen of the ester group through a methylene bridge and to which a radical containing a carboxylic acid amido or epoxy group is attached, and at least one other mono-ethylenically unsaturated polymerizable compound. The stipulation that the quaternary nitrogen atom must not be bound to the oxygen of the ester group through a methylene bridge means that at least two carbon atoms should be situated between the nitrogen atom and said oxygen atom. The term "at least copolymerizable acid" encompasses acids which are polymerizable with themselves and also copolymerizable as well as acids that are only copolymerizable.

Suitable starting materials for making the quaternary ammonium compounds to be used in the present invention are basic esters which contain a tertiary amino group which is not bound to the oxygen of the ester group by a methylene bridge. Such esters are known, or can be made by methods in themselves known. The basic esters may be derived from any polymerizable or copolymerizable acids such as crotonic acid, maleic acid, furylacrylic acid, α-chloracrylic acid, methacrylic acid, but especially acrylic acid. For making the basic esters, which contain at least one tertiary amino group, there may be used any basic compounds which contain an esterifiable group, the various known alkanolamines, such as triethanolamine, dimethyl-ethanolamine or heterocyclic compounds, such as hydroxyethyl-morpholine, and also aminophenols, for example, para-dimethylaminophenol. If amino-hydroxy-compounds are used which contain no tertiary amino group, the conversion of the primary or secondary amino groups into tertiary amino groups may be carried out before or after the formation of the ester. If compounds containing several esterifiable hydroxyl groups are used, compounds can be made which contain two or more polymerizable groupings. By using starting materials which contain several basic nitrogen atoms it is possible to introduce several quaternary groupings into the molecule. There may also be used as starting materials basic polymerizable compounds which contain a hardenable component. Such compounds can be made, for example, by reacting a formaldehyde condensation product of a compound of the amino-triazine or urea group with a compound introducing the acrylic acid radical and with an amino-hydroxy-compound of the kind mentioned above, and so selecting the relative proportions of the reactants that at least one methylol group or methylol group etherified with a lower alcohol, which group enables hardening to take place, remains in the molecule, unless methylol groups are introduced subsequently.

As will be apparent from the foregoing description a large number of starting compounds may be used for making the quaternary ammonium compounds. The above enumeration of compounds is incomplete and merely indicates the various possible alternatives.

Those compounds are preferred which contain only one tertiary amino group and the molecule of which contains only aliphatic radicals or aliphatic and heterocyclic radicals or which, if it contains an aromatic radical, contains no radical other than a six-membered aromatic radical, that is to say, a benzene radical which may be substituted.

The quaternary ammonium compounds are made by methods in themselves known by the action of compounds which are capable of converting tertiary amino groups into quaternary ammonium groups and of introducing at the same time a carboxylic acid amido or epoxy group; especially valuable quaternating agents are epichlorhydrin and chloracetamide. The quaternating agents as hereinbefore defined present the advantage over the usual quaternating agents that compounds are formed which are not merely polymerizable, but are capable of undergoing further reactions, too. As a rule, this latter property characterizes also the polymerization and copolymerization products made from the monomeric compounds. Such monomeric or polymeric compounds can be used, for example, for cross linking reactions.

Another method of preparing the quaternary ammonium compounds consists in using basic compounds which are saturated but which can easily be converted into unsaturated polymerizable compounds. For example, the basic β-chloro-propionic acid ester may be quaternated and hydrogen chloride subsequently split off.

The quaternary ammonium compounds are generally soluble in water in the monomeric condition, provided that they are derived from the usual inorganic or organic acids.

In accordance with the invention the quaternary ammonium compounds are polymerized jointly with at least one other unsaturated compound. As such unsaturated compounds there come into consideration, more especially, compounds containing the atomic grouping $CH_2=C<$, such as vinyl esters of organic acids, for example, vinyl acetate, vinyl formate, vinyl butyrate, vinyl benzoate, and also vinyl alkyl ketones, vinyl halides such as vinyl chloride, vinyl fluoride, vinylidene chloride, and vinylaryl compounds such as styrene and substituted styrenes, and also compounds of the acrylic acid series such as esters of acrylic acid and alcohols or phenols containing no quaternary ammonium groups, for example, ethyl acrylate, butyl acrylate, dodecylacrylate, acrylonitrile or acrylic acid amide and derivatives thereof substituted at the amide-nitrogen atom and containing no quaternary ammonium groups, and also analogous derivatives of methacrylic acid, α-chloracrylic acid, crotonic acid, maleic acid or fumaric acid. There may also be used polymerized olefines, such as isobutylene, butadiene, 2-chloro-butadiene or heterocyclic compounds containing at least one vinyl group, such as vinyl-pyridine. Preference is given the derivatives of acrylic acid containing no quaternary ammonium groups. Binary, ternary or more complex copolymers may be made, of which the properties can be adjusted by the choice of the starting materials, the relative proportions of the individual components and the polymerization conditions.

The polymerization may be carried out in bulk, in solution or in emulsion, the customary polymerization techniques being used. Thus, for example, it is of advantage to use a polymerization catalyst. There may be used the usual compounds that catalyse polymerizations, such as organic or inorganic peroxides or per-salts, for example, peracetic acid, acetyl peroxide, benzoyl peroxide, benzoyl-acetyl peroxide, lauryl peroxide, cumene hydroperoxide, tertiary-butyl hydroperoxide, paramenthane hydroperoxide, hydrogen peroxide, percarbonates, persulphates or perborates. The proportions of these additions are chosen in known manner depending on the course of reaction or the desired properties of the polymer. If desired, a plurality of agents catalysing the polymerization may be used. The action of the polymerization catalyst may be enhanced by the action of heat and/or actinic rays. It may also be possible to carry out the polymerization only with the aid of heat and/or actinic rays without the addition of a catalytic compound. In order to modify the speed of reaction of the polymerization and the molecular weight of the polymer produced, a so-called regulator may be added such, for example, as a mercaptan, terpene or the like.

It is also of advantage to carry out the polymerization in the absence of air or oxygen and in the presence of an inert gas, such as nitrogen or carbon dioxide. It is also possible to use, in addition to the aforesaid catalysts and regulators, so-called activators. Such activators are, for example, inorganic oxidizable oxygen-containing sulfur compounds, such as sulfur dioxide, sodium bisulfite, sodium sulfite, ammonium bisulfite, sodium hydrosulfite and sodium thiosulfate. By the simultaneous use of the aforesaid activators and polymerization catalysts yielding oxygen there are formed so-called Redox systems, which favorably influence the polymerization process. As activators there may also be used water-soluble aliphatic tertiary amines, such as triethanolamine or diethyl-ethanolamine. It is also possible to accelerate the action of the polymerization catalyst by the addition of a heavy metal compound, which is capable of existing in more than one valency stage and is present in the reduced condition, or by the addition of a complex cyanide of iron, cobalt, molybdenum, mercury, zinc, copper or silver or a mixture of such complexes. When the polymerization is carried out in an emulsion the monomeric compounds are advantageously emulsified with the aid of an emulsifying agent. As emulsifying agents there come into consideration those of cation-active or non-ionogenic character. Among the group of cation-active emulsifying agents there may be used, for example, compounds of higher fatty amines with acetic acid, hydrochloric acid or sulfuric acid such as octadecylamine acetate, (dodecyl)-diethylcyclohexylamine sulfate, and also salts of diethylaminoethyl esters of higher fatty acids or salts of the type of oleyl amido ethyl-diethylamine acetate $$C_{17}H_{33}CONHC_2H_4NH(C_2H_5)_2 \cdot OCOCH_3$$

There are also suitable quaternary ammonium compounds, such as cetyl-dimethyl-benzyl-ammonium chloride, cetyl-trimethyl-ammonium bromide, para-(trimethylammonium)-benzoic acid cetyl ester methosulfate, cetyl-pyridinium methosulfate, octadecyl-trimethyl-ammonium bromide or the quaternary ammonium compound from diethyl sulfate and triethanolamine tristearate.

Among the non-ionogenic emulsifying agents there may be mentioned polyglycol ethers of fatty acids, fatty amines or fatty alcohols of high molecular weight, such as cetyl alcohol, oleyl alcohol or octadecyl alcohol, for exampe, the reaction products of 15–30 mols of ethylene oxide with 1 mol of the fatty alcohol. There may also be used emulsifying agents having a pronounced wetting action, such as octyl-phenol polyglycol ethers, and also lauryl alcohol polyglycol ethers or polyhydric alcohols partially esterified with higher fatty acids such, for example, as glycerine monolaurate and sorbitol monolaurate. There may also be used mixtures of such emulsifying agents or mixtures of such emulsifying agents with protective colloids, such as polyvinyl alcohols, partially hydrolyzed polyvinyl esters, and also starches and starch derivatives, for example, dextrin, and also cellulose ethers, polyethylene oxides, and generally also with water-soluble polymers or copolymers which contain free hydroxyl, amino or carboxylic acid amide groups. Finally, such protective colloids may be used alone.

If the polymerization is carried out in solution, there may be used a solvent in which only the monomeric compounds are soluble and in which the polymers are insoluble. Alternatively, there may be used solvents in which the polymers are also soluble.

Suitable solvents are, e.g. water and organic solvents, such as methylene chloride and dichlorethane.

The polymerization may be carried out at the ordinary temperature. However, it is more advantageous to carry out the polymerization at a raised temperature. Suitable temperatures are, for example, 40–95° C., and especially 55–90° C. Considerable quantities of heat are often liberated in the polymerizations, so that suitable cooling devices must be used, in order to maintain the desired polymerization temperature. This is necessary when a large quantity is polymerized in one batch. In order to utilize the heat liberated and easily control the polymerization temperature it has been found advantageous in the case of emulsion polymerization, for example, to place in the polymerization apparatus only a small part of the total quantity of an emulsion to be treated and to allow the polymerization to commence in this portion. When this portion of the emulsion attains a certain temperature, for example, 60–70° C., the remaining cold emulsion is run in in such manner that the temperature is maintained constant. Towards the end of the polymerization it is often necessary to supply heat externally.

Depending on the polymerization conditions and the starting materials used, the polymeric compounds are obtained in the form of viscous solutions, granulates or in the form of emulsions. The material which is obtained directly by the polymerization may be used without being further worked up. Frequently it is preferable to work it up beforehand in a suitable manner for example, modifying substances, such as softening agents, for example, dibutyl phthalate or dioctyl phthalate or sebacic acid ester, or organic or inorganic pigments or filling materials may be added. Furthermore, the polymerization of the monomeric compounds may be carried out in the presence of a substratum for example, the polymerization may be carried out on a textile material. For this purpose the textile material is advantageously impregnated with a solution or emulsion of the monomers, and then the polymerization is brought about with the addition of a polymerization catalyst by heating the material. When polymerizable and hardenable quaternary compounds are used, the polymerization and the hardening may be carried out in two separate steps, by first polymerizing the material and then hardening it. Alternatively, both operations may be carried out simultaneously. For carrying out the hardening it is of advantage to use a hardening catalyst. For this purpose the customary hardening catalysts may be used, for example, acids such as hydrochloric acid, sulfuric acid or formic acid, or salts of strong acids with weak bases, for example ammonium salts of strong inorganic or organic acids, such as ammonium chloride, ammonium sulfate, ammonium nitrate, ammonium oxalate or ammonium lactate. When solutions in organic solvents are used, there come into consideration catalysts which are soluble in the organic solvent, for example, strong organic acids such as formic acid, acetic acid, chloracetic acid, or compounds capable of splitting off acid at a raised temperature, such as tartaric acid diethyl ester or triacetin.

The water-dispersible copolymers obtainable by the process of the invention can be used for a very wide variety of purposes. They are generally applicable for all applications involving the use of polymerization resins or polymerization and condensation resins. Products which have been obtained from suitable starting materials can be used, inter alia, as assistants in the textile, leather and paper industries. They can be used for preparing impregnating and coating compositions, for example, textiles can be rendered water-repellent with suitably substituted compounds. Some polymers are also suitable for animalizing cellulose-containing textile materials, and also as after-treating agents for improving the fastness to washing and water of dyeings or prints of water-soluble direct-dyeing dyestuffs, of which the solubility in water is due to the presence of sulfonic acid or carboxylic acid groups. Such an after-treatment may be combined with an after-treatment with a copper salt. The new products are also suitable in dyeing, printing or dressing natural or artificial fibres with pigments or for producing matt effects on polyamide fibres.

In general dressings produced with the products of this invention withstand use well.

The following examples illustrate the invention the parts being by weight unless otherwise stated and the relationship between parts by weight and parts by volume being the same as that of the kilogram to the liter:

*Example 1*

For the preparation of the quaternary compound from [β-diethylamino-ethyl]-acrylate and chloracetamide

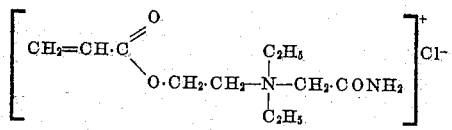

17.13 parts (1/10 mol) of (β-diethylamino-ethyl)-acrylate, 9.35 parts (1/10 mol) of chloracetamide, and 26.48 parts of distilled water are heated together for 7½ hours at 80–85° C., after which the reaction is complete and a clear yellow solution obtained containing 50 percent of the quaternary ammonium compound in a monomeric state which is suitable for polymerization purposes.

This quaternating reaction also takes place at a lower temperature by heating for 11½ hours at 58–62° C. if the reaction is carried out in the presence of 0.25 part of potassium iodide or 1 percent calculated on the weight of the reaction constituents.

*Example 2*

21 parts of styrene are emulsified with vigorous stirring by mechanical means or with agitation in a mixture of 18 parts of the solution of about 50 percent strength of the quaternary compound described in Example 1, 1 part of the cation-active emulsifier which is obtained by quaternation of lauroylamido-ethyl-dimethyl amine with chloracetamide in known manner, 0.1 part of isooctanol and 61 parts of distilled water. The emulsion is polymerized by the gradual addition of a solution of 0.2 part of potassium persulfate and 1 part of the above described cation-active emulsifier

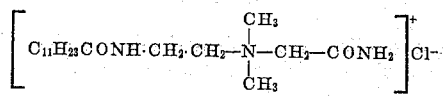

in 5 parts of distilled water with stirring at 70–80° C. for 3½ hours. After cooling, a very slight quantity of coarser constituents is filtered off. There is obtained a thinly liquid, finely divided stable dispersion having a dry content of 30 percent which is suitable for dressing purposes, particularly for the production of matt effects on fabrics of fine polyamide fibers.

*Example 3*

The quaternary compound from [(β-diethylamino)-ethyl]-crotonate and chloracetamide was obtained as follows:

26.5 parts of crotonic acid chloride are added dropwise to a mixture of 29.25 parts of diethylamino-ethanol in 45 parts of acetonitrile with stirring in the course of ½ hour. The reaction mixture is heated for 3 hours at 70–73° C. and allowed to stand overnight. 33.83 parts of an aqueous solution of caustic soda of 30 percent strength are then cautiously added, the sodium chloride, which has precipitated for the greater part, is separated off by suction-filter and the acetonitrile is distilled in vacuo with heating. The remaining oily residue is fractionated in vacuo. (β-diethylamino-ethyl)-crotonate is a clear yellow oil boiling at 108–111° C. under 13 mm. of pressure and has a yield of about 80 percent.

For the purpose of converting it into the quaternary ammonium compound 3.7 parts of [(β-diethylamino)-ethyl]-crotonate are mixed with 1.87 parts of chloracetamide and the mixture is heated for 7 hours with stirring in an oil bath heated to 110° C. By adding 5.57 parts of distilled water there is obtained an aqueous solution of about 50 percent strength of the quaternary ammonium compound

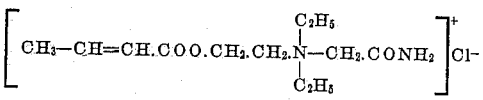

which is suitable for copolymerization in emulsion or in aqueous solution.

The quaternary ammonium compound can be dissolved with alcohol instead of with water, should this appear an advantage.

*Example 4*

The quaternary compound from [(β-diethylamino)-ethyl]-fumarate and chloracetamide

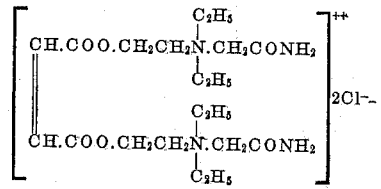

was obtained as follows:

A mixture of 39 parts of diethylamino-ethanol in 100 parts of acetonitrile is reacted with 26 parts of fumaryl chloride in the manner described in Example 3. In order to decompose the reaction product, 45.33 parts of an aqueous solution of caustic soda of 30 percent strength are added, and working up is carried on as described in Example 3. The reaction product is an oil which is purified by fractionation in high vacuum; it boils at 148–154° C. under 0.35 mm. of pressure; yield 69.3 percent.

The quaternary ammonium compound is obtained by heating for 14 hours a mixture of 6.48 parts of (β-diethylamino-ethyl)-fumarate and 3.74 parts of chloracetamide in an oil bath at a bath temperature of 110° C. with stirring. After cooling, the reaction product is dissolved in 10.22 parts of alcohol, whereby an alcoholic solution of 50 percent strength of the quaternary ammonium compound is obtained which is suitable for copolymerization.

*Example 5*

A mixture of 45 parts of methyl methacrylate and 10 parts of the alcoholic solution of about 50 percent strength of the quaternary ammonium compound prepared as described in Example 4, and 43 parts of alcohol of 96 percent strength is polymerized by gradually adding 5 parts of a solution of 10 percent strength of benzoyl peroxide in benzene and heating for 7 hours at 73–75° C.

The copolymer separates off as a firm, viscous cohesive mass. It is disintegrated, boiled for a short while with plenty of distilled water, suction-filtered and dried at a raised temperature in vacuo.

The hard resin is suitable for the production of special lacquers. For this purpose it can, for example, be dissolved in benzene.

*Example 6*

0.8 part of the anhydrous quaternary ammonium compound described in Example 3 is dissolved in 0.8 part of alcohol and mixed with 39.2 parts of styrene and 50 parts of toluene. The mixture is polymerized for 15 hours by heating to 101–102° C. with stirring and by gradually adding 10 parts of a solution of 10 percent strength of benzoyl peroxide in toluene and 0.3 part of ditertiary butyl peroxide.

There is obtained a viscous yellow colored solution of the copolymer having a resin content of 38 percent. The solution dries to form clear colorless films. It is suitable for the production of valuable special lacquers, particularly in admixture with organic soluble melamine-formaldehyde lacquer resins.

*Example 7*

25.2 parts of styrene and 7.2 parts of n-butyl acrylate are emulsified in a mixture of 7.2 parts of the alcoholic solution of 50 percent strength of the quaternary ammonium compound prepared as described in Example 4, 0.77 part of [γ-laurylamido)-propyl]-diethyl-methyl ammonium methosulfate, 0.1 part of isooctanol and 70 parts of distilled water. This emulsion is polymerized by adding a solution of 0.15 part of potassium persulfate, 0.77 part of [(γ-laurylamido)-propyl]-diethyl-methyl ammonium methosulfate in 10 parts of distilled water in portions in the course of 5 hours at 74–80° C. with stirring and under nitrogen. There is obtained a thinly liquid finely divided stable dispersion having a dry content of 29.9 percent which is suitable for dressing purposes, particularly for the production of matt effects on fabrics of fine polyamide fibers.

*Example 8*

37.5 parts of isobutyl acrylate, 10 parts of acrylonitrile and 0.12 part of isooctanol are emulsified with vigorous stirring or agitation in a mixture of 5 parts of the aqueous solution of 50 percent strength of the quaternary compound from crotonic acid-(β-diethylamino)-ethyl ester and chloracetamide obtained in the manner described in Example 3, and 1.62 parts of [(γ-laurylamido)-propyl]-trimethyl ammonium methosulfate and 57.5 parts of distilled water. For the purpose of polymerization, the emulsion is heated under nitrogen and with stirring at 65° C. and a solution of 0.33 part of potassium persulfate, 1.63 parts of laurylamido-propyl-trimethyl-ammonium methosulfate in 15 parts of distilled water is added gradually. Polymerization is completed at the end of 2 hours. There is obtained a thinly liquid finely divided very stable emulsion having a resin content of 40 percent which when spread on substrata and dried forms an elastic, rubber-like film. The emulsion is suitable in admixture with paraffin emulsions containing aluminum salt for water-repellent dressings of fabrics. It can be used by itself and also together with cation-active softening agents, fastness improving agents and particularly with water-soluble melamine or urea-formaldehyde precondensates for the dressing of fabrics.

*Example 9*

A solution of 8 parts of acrylic acid amide and 4 parts of an aqueous solution of 50 percent strength of the monomeric quaternary ammonium compound from (β-diethylamino-ethyl)-acrylate and chloracetamide prepared as described in Example 1, and 87 parts of distilled water is heated to 60° C. In the course of 2 hours a solution of 0.1 part of potassium persulfate in 2 parts of distilled water is added in portions. Finally the whole is stirred for another ½ hour at 65–70° C. after which polymerization is complete.

The copolymer is a highly viscous clear liquid having a dry content of 9.9 percent which is suitable for the production of sizing agents which diminish the electrostatic charge of textiles.

What is claimed is:

1. A water-dispersible polymerization product yielding stable emulsions which contains copolymerized (1) an ester of a copolymerizable aliphatic carboxylic acid corresponding to the formula

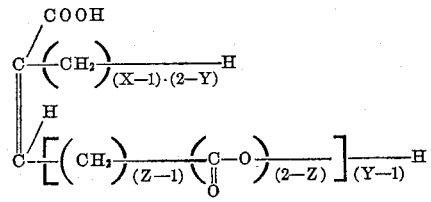

wherein X, Y and Z each represents an integer of at least 1 and at the most 2, containing in the alcohol portion of the molecule one quaternary nitrogen atom which by one of its four valences is bound to the oxygen of the ester group by an alkylene radical containing at least two and at the most three carbon atoms, and which quaternary nitrogen atom is further bound by one of its four valences to a radical selected from the group consisting of a carboxamidomethyl radical and an 1,2-epoxy propyl radical and the remaining two valences of the quaternary nitrogen atom each are bound to saturated aliphatic radicals, and (2) at least one other polymerizable compound selected from the group consisting of a monoethylenically unsaturated compound and a diene containing conjugated double bonds.

2. A water-dispersible polymerization product yielding stable emulsions which contains copolymerized (1) an ester of a copolymerizable aliphatic carboxylic acid corresponding to the formula

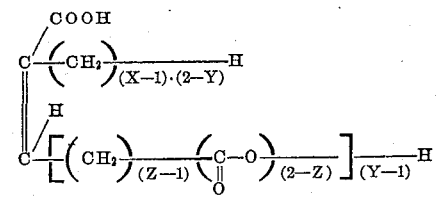

wherein X, Y and Z each represents an integer of at least 1 and at the most 2, containing in the alcohol portion of the molecule one quaternary nitrogen atom which by one of its four valences is bound to the oxygen of the ester group by an alkylene radical containing at least two and at the most three carbon atoms, and which quaternary nitrogen atom is further bound by one of its four valences to a radical selected from the group consisting of a carboxamidomethyl radical and an 1,2-epoxy propyl radical and the remaining two valences of the quaternary nitrogen atom each are bound to lower alkyl radicals, and (2) at least one other polymerizable compound selected from the group consisting of a monoethylenically unsaturated compound and a diene containing conjugated double bonds.

3. A water-dispersible polymerization product yielding stable emulsions which contains copolymerized (1) the compound of the formula

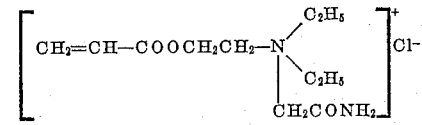

and (2) at least one other ethylenically unsaturated monofunctionally polymerizable compound, which last mentioned compound is employed in a minor proportion when said compound is acrylonitrile.

4. A water-dispersible polymerization product yielding stable emulsions which contains copolymerized (1) the compound of the formula

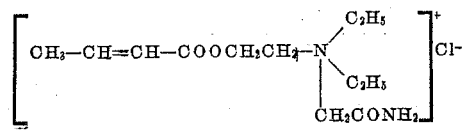

and (2) at least one other ethylenically unsaturated monofunctionally polymerizable compound, which last mentioned compound is employed in a minor proportion when said compound is acrylonitrile.

5. A water-dispersible polymerization product yielding stable emulsions which contains copolymerized (1) the compound of the formula

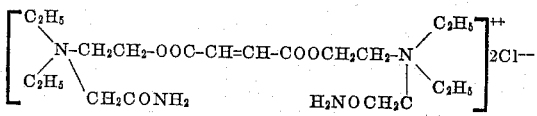

and (2) at least one other polymerizable compound selected from the group consisting of a monoethylenically unsaturated compound and a diene containing conjugated double bonds.

6. A water-dispersible polymerization product which contains in stable aqueous emulsion copolymerized the compound of the formula

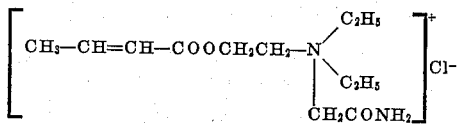

isobutylacrylate and a minor proportion of acrylonitrile.

7. A water-dispersible polymerization product which contains in stable aqueous emulsion copolymerized the compound of the formula

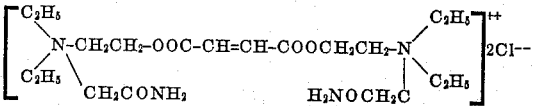

styrene and n-butylacrylate.

8. A monomer useful for the production of polymers consisting of an ester of a copolymerizable aliphatic carboxylic acid corresponding to the formula

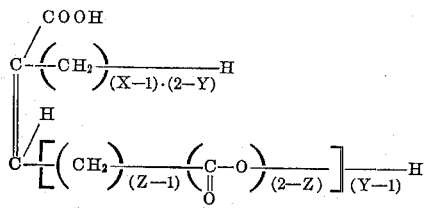

wherein X, Y and Z each represents an integer of at least 1 and at the most 2, containing in the alcohol portion of the molecule one quaternary nitrogen atom which by one of its four valences is bound to the oxygen of the ester group by an alkylene radical containing at least two and at the most three carbon atoms, and which quaternary nitrogen atom is further bound by one of its four valences to a radical selected from the group consisting of a carboxamidomethyl radical and an 1,2-epoxy propyl radical and the remaining two valences of the quaternary nitrogen atom each are bound to saturate aliphatic radicals.

9. A monomer of an ester of acrylic acid which in the alcohol portion of the molecule contains one quaternary nitrogen atom, which by one of its four valences is bound to the oxygen of the ester group by an alkylene radical containing at least two and at the most three carbon atoms and which quaternary nitrogen atom is further bound by one of its four valences to a radical selected from the group consisting of carboxamidomethyl radical, 1,2-epoxy propyl radical and the remaining two valences of the quaternary nitrogen atom each are bound to saturated aliphatic radicals.

References Cited in the file of this patent
UNITED STATES PATENTS

| | | |
|---|---|---|
| 2,484,420 | Minsk, et al | Oct. 11, 1949 |
| 2,677,679 | Barney | May 4, 1954 |
| 2,729,622 | Albisetti, et al | Jan. 3, 1956 |